United States Patent [19]

Munro

[11] Patent Number: 4,833,788
[45] Date of Patent: May 30, 1989

[54] UNIVERAL LEVEL LIGHT ADAPTER

[76] Inventor: John C. Munro, 11 Holly St., Gloucester, Mass. 01930

[21] Appl. No.: 117,950

[22] Filed: Nov. 9, 1987

[51] Int. Cl.$^4$ .................................................. G01C 9/32
[52] U.S. Cl. .................................................... 33/348.2
[58] Field of Search .............................. 33/348.2, 348

[56] References Cited

U.S. PATENT DOCUMENTS

| 1,169,005 | 1/1916 | Caswell et al. | 33/348.2 |
| 1,294,878 | 2/1919 | Constantine | 33/348 X |
| 2,198,945 | 4/1940 | Morris | 33/348.2 |
| 2,305,678 | 12/1942 | Cravaritis et al. | 33/348 |
| 2,652,481 | 9/1953 | Hall | 33/348.2 |

FOREIGN PATENT DOCUMENTS 155501 10/1932 Switzerland ..................... 33/348.2

Primary Examiner—William D. Martin, Jr.
Attorney, Agent, or Firm—Donald N. Halgren

[57] ABSTRACT

A spirit level light adapter assembly having a housing which is securable to a spirit level. The adapter has a pair of flexible, resilient, light supports which are extendable from an opening at each end of said housing. The housing contains a battery, a switch and a circuit connecting light emitting components in the end of each light support. The housing is securable to any size spirit level to permit the sight openings and/or the work element to be illuminated.

18 Claims, 2 Drawing Sheets

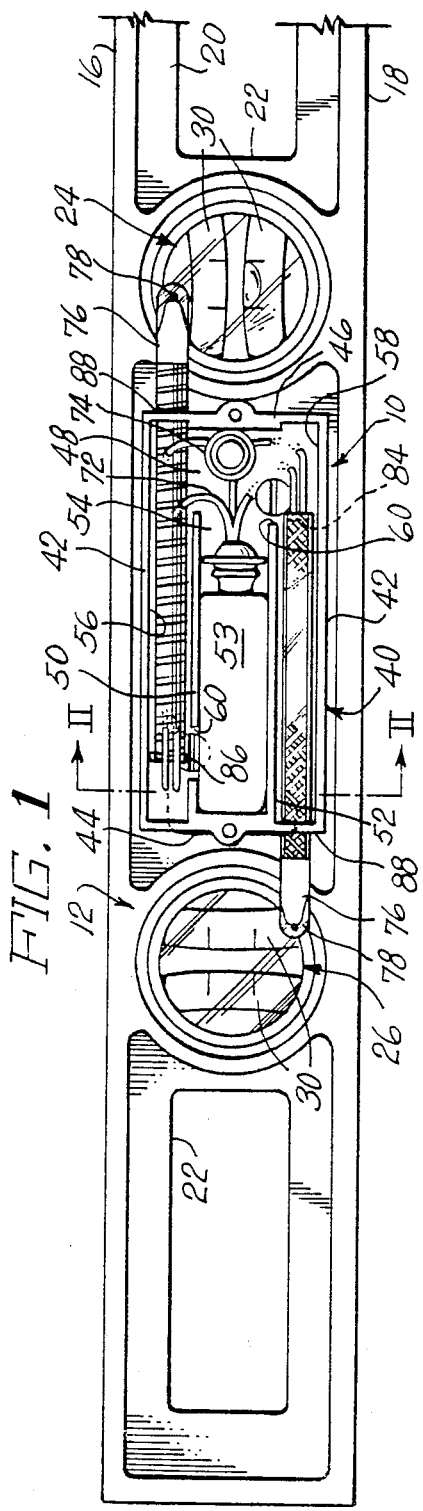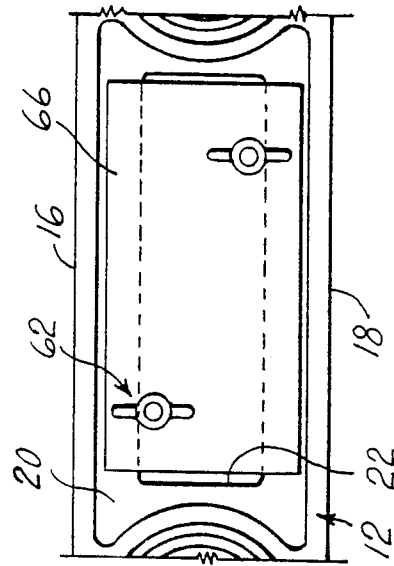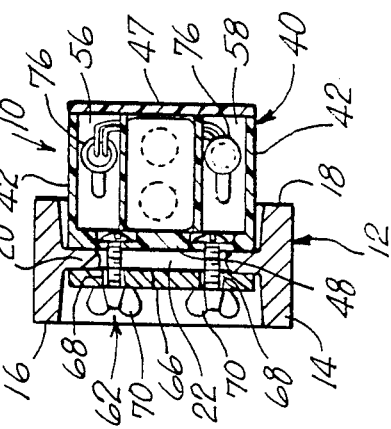

UNIVERAL LEVEL LIGHT ADAPTER

BACKGROUND OF THE INVENTION

(1) Field of the Invention

The present invention relates to spirit levels and more particularly to illumination adapters which are arrangable on a plurality of different spirit levels.

(2) Prior Art

Craftsmen, such as carpenters, cabinet makers, plumbers, sheetmetal workers, masons and the like, use spirit levels. Their tools may in fact include three or four different types or lengths of levels.

These levels may occasionally be needed in dark work areas, where the glass sight openings are difficult to see. It may also be difficult to see the work which itself is being leveled, as well as handling the level, hindering the making of any marks or adjustments to the workpiece and the like.

An early attempt at lighting a level is shown in U.S. Pat. No. 794,753 to Stetson, which shows a spirit level with a built-in battery and light for illuminating the bubble glass. This arrangement permits only the level glass to be lighted, and is not articulable for work surfaces being levelled.

A later attempt at providing light for a spirit level is shown in U.S. Pat. No. 2,205,733 to Sauter et al, wherein a pair of batteries hold a pair of bulbs inside the level housing, against the sight openings. Again, there is no ability for moving the lights with respect to the sight openings and/or the level itself or the elements that it is mused to level.

U.S. Pat. No. 2,607,882 to Arnold discloses an illuminated level, wherein an attachment unit is connected to an "un-lit" spirit level to light the sight openings. This is an improvement over the art, but it is limited in use to a single style or dimension of level where the sight openings are a particular distance apart. The attachment is not adaptable to different size levels with varying spaces between their respective sight openings. The light attachment of Arnold is utilizable for the one level that it is made for and nothing else.

U.S. Pat. No. 3,003,054 to Hubbard also discloses an illuminated spirit level, with an electric bulb in a channel support, for illuminating a sight opening.

None of the prior art shows an adaptor light assembly which may be movable from one type of level to another, which may be of a different size or style, and which light is articulable to help light a work area being levelled.

It is an object of the present invention to overcome the disadvantages of the prior art by providing a transferrable light adapter assembly which a craftsman may use on any one of several different spirit levels he has in his tool supply and which assembly may be utilized to light the work area as well.

BRIEF SUMMARY OF THE INVENTION

The present invention comprises an adaptable light assembly which is attachable to most spirit levels by securement means. The light assembly comprises a pair of articulable extensible light supports which permit light to be displayed upon sight openings in various size levels, as well as displaying light upon the areas being worked upon.

Spirit levels usually comprise metal frame assemblies having I-shaped cross-sections and an open substantially rectangular frame having upper and lower wall portions and end walls. At least two sight openings are usually arranged between the upper and lower wall portion and spaced about 4" to 6" or more apart. The sight openings usually comprise a pair of vertically disposed arcuate level tubes, and a pair of horizontally disposed arcuate level tubes, respectively.

The adaptable light assembly comprises a generally rectangularly shaped housing, having dimensions of no greater than about four inches long, about one and three quarter inches wide and about one inch thick. These limitations are critical because the housing must fit within the rails of the typical spirit level frame. "Adapter" sizes much bigger than these would not fit within all the level frames which a craftsman might utilize. The housing adapter has a back plate, a pair of side walls, a pair of end walls and a top cover. The housing has a first and a second longitudinally disposed alignment panel which divides the housing into three chambers, comprising a middle chamber and a first and a second outer chamber.

The housing has a holding means disposed through the back plate. The holding means comprises a pair of bolts which are arranged through a pair of openings in the back plate. The holding means may be disposed through the hand opening in a typical spirit level. A holding plate is disposed on the opposite side of the web of the frame of the level. The holding means extends through the holding plate and secures the frame therebetween.

A battery may be disposed in the middle chamber connected through wires to an on-off push button type switch. A flexible, resilient, longitudinally elongated, extendable light support is disposed in both the first and second outer chambers.

Each light support has a distal end with a light emitting means, such as a bulb secured in a socket in the distal end of each support. The light supports are each extendable through an opening in their respective end walls. The light supports may be comprised of coaxial cable such as that used for light pens or the light supports may be made from woven metal filaments and covered with a thin film of plastic. Either support would permit the light at the distal end to be held stiffly when the support is pulled through its opening in the wall of the housing. The light supports may be extended from the housing to reach a sight opening which may be slightly spaced from its adjacent end wall of the housing. The light supports may be about the same length as the length of the housing. A wire arrangement comprising a proper circuit connects the light emitter or bulb and the metal of the light support to the battery and switch.

The proximal end of each light support has a tab or rim extending thereon, to prevent the light support from being pulled completely out of the housing.

The supports may be extended their full length from the ends of their housing and contorted over the spirit level so as to be able to throw light from their light emitters onto a work area that would otherwise be dark.

Thus what is shown and described is a novel light adapter kit for spirit levels which adaptor kit is small and attachable so it will fit most levels of a carpenter, plumber or mason. The holding means may comprise screws which could easily be secured to the wooden frame of a typical mason's level. By virtue of the extensible and bendable nature of the light supports, most size levels can be lit as well.

BRIEF DESCRIPTION OF THE DRAWINGS

The objects and advantages of the present invention will become more apparent when viewed in conjunction with the following drawings, in which:

FIG. 1 is a side elevational view of a light adapter which is fit into a frame of a typical spirit level;

FIG. 2 is a view taken along the lines II—II of FIG. 1;

FIG. 3 is a view of the back side of the typical level shown in FIG. 1, showing the holding panel therewith;

DESCRIPTION OF THE PREFERRED EMBODIMENT

Figure 4:
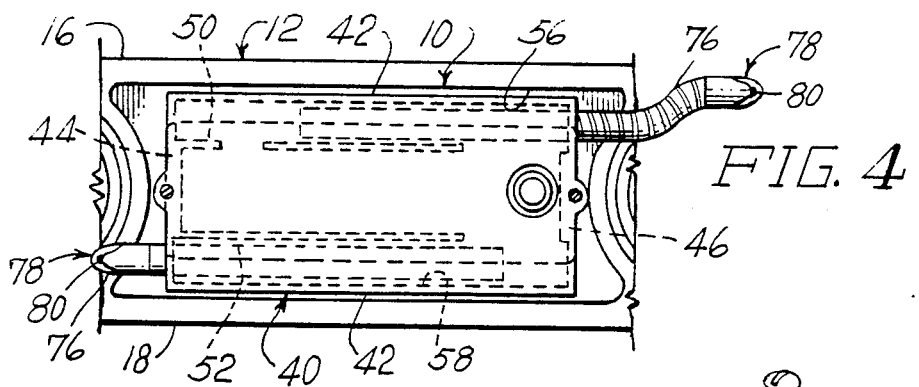
FIG. 4 is a partial view similar to FIG. 1, with one of the light supports articulated over the top side of the spirit level.

Referring to the drawings in detail and particularly to FIG. 1, there is shown an adaptable light assembly 10 attached to a typical spirit level 12. The spirit level 12 generally comprises a substantially rectangular metal frame 14 having an "I" shaped cross-section, as shown in FIG. 2. The frame 14 will have an upper and a lower wall member 16 and 18 connected by an attached wall 20. The attached walls 20 will have a hand opening 22 in most carpentry and plumbing levels. The level 12 has a horizontal sight opening 24 and a vertical sight opening 26 typically spaced more than about four inches apart. The sight openings 24 and 26 usually comprise a pair of arcuate tubes 30, having an air bubble therein.

The adaptable light assembly 10 comprises a generally rectangularly shaped housing 40, made from plastic material, having a long side wall 42 of no more than about four inches in length, having a pair of end walls 44 and 46 of no more than about one and three quarter inches in length, the walls 42, 44 and 46 preferably being no more than one inch high and a cover panel 47 attachable by known means to the housing 40. The dimensions are critical, because the upper and lower wall members 16 and 18 of most commercially available spirit levels are spaced no more than about two inches apart from one another. The housing 40 has a back plate 48 contiguous to the end and side walls 42, 44 and 46. The housing 40 also has a first and a second alignment panel 50 and 52 which divides the housing 40 into three longitudinally directed chambers comprising a middle chamber 54 and a first and a second outer chamber 56 and 58. Each alignment panel 50 and 52 may have a gap 60 of about three-eighths of an inch spaced thereacross, being of sufficient width to place a holding means 62 such as a bolt or wood screw therethrough. The holding means 62 would each extend through an opening 64 disposed in the back plate 48, as may be seen in FIGS. 2 and 5. The holding means 62 would extend through the hand opening 22 to the otherside of the level 12, as shown in FIGS. 2 and 3.

A holding plate 66 is disposed on the opposite side of the attaching wall 20 from the housing 40. The holding means 62 mate with openings 68 in the holding plate 66 and are secured thereto by a pair of wing nuts 70, or the like.

A battery 53 is arranged in the middle chamber 54 and has a wiring harness 72 attached to its terminals. The wiring harness 72 is connected to a push button electrical on-off switch 74 which is mounted in the middle chamber 54 of the housing 40. A flexible, resilient, longitudinally extendable light support 76 is movably disposed in both the first and second chambers 56 and 58.

Each light support 76 has a light emitting means 78 at its distal end. The light emitting means 78 may comprise a bulb 80 secured into a socket 82 in each support 76. The light emitting means 78 may also comprise a light conducting glass fiber or a light emitting diode. The light emitting means 78 is attached through a proper energization circuit 83, a portion of which, may consist of the light support 76 itself. The socket 82 would have a wire from the wiring harness 72 attached thereon.

Figure 5:
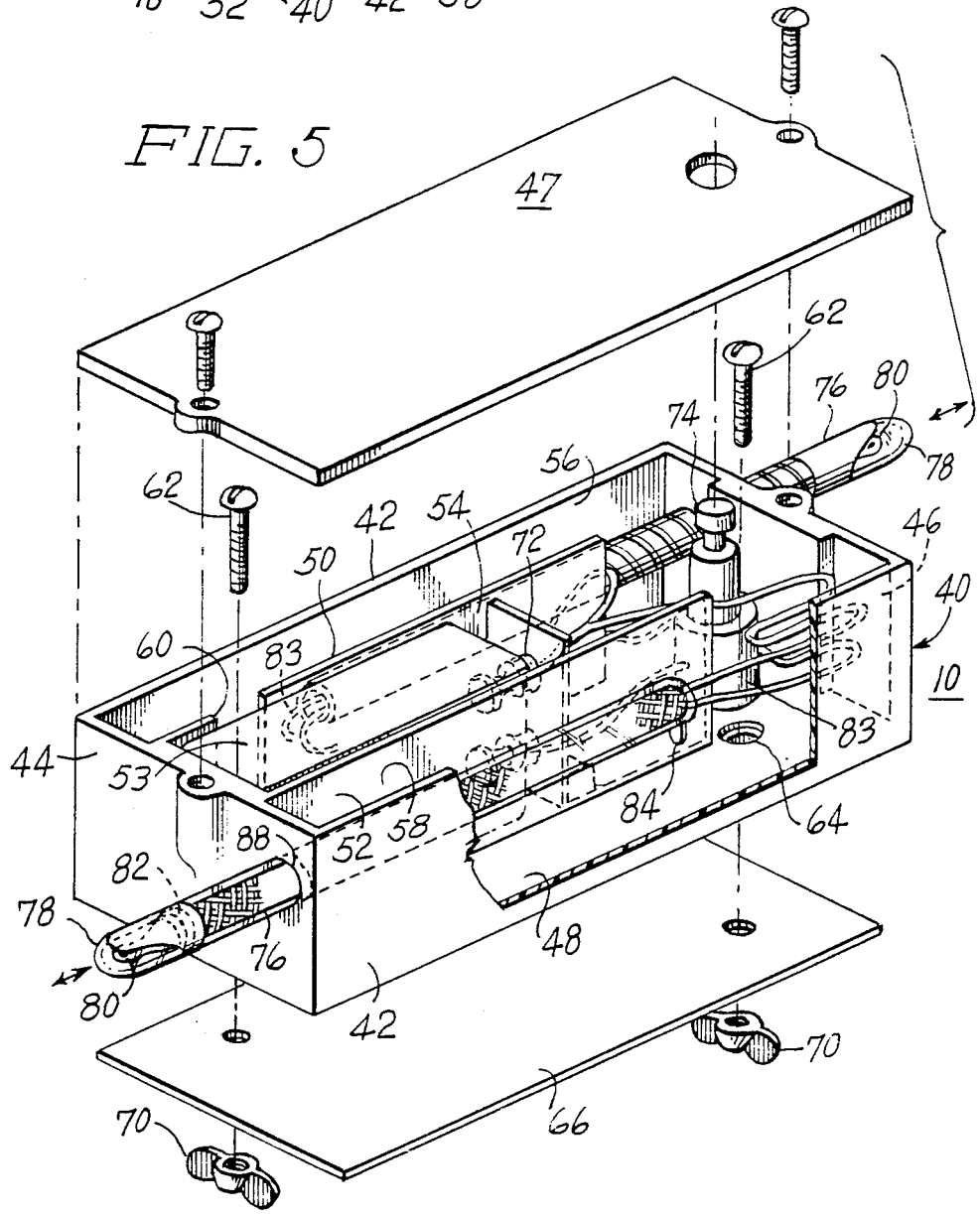
FIG. 5 is an exploded perspective view of the light adapter kit by itself.

Each light support 76 may be a bendable metallic coil such a coaxial cable, such as shown in FIGS. 1, 4 and 5 or it may be comprised of a woven metallic filament and covered with a thin coating of plastic material so as to minimize wear and abrasion of the woven material such as also shown in FIGS. 1 and 5. A further alternative material for the light support 76 may comprise metal tubing such as about one-quarter inch diameter copper tubing, (not shown), into which the socket 82 and bulb 80 could be mated.

The proximal end of each light support 76 has a tab 84 or an annular rim 86 extending therearound. Each end wall 44 and 46 has an opening 88, as shown in FIG. 5, for the light support 76 to be moved through. The tab 84 or annular rim 86 prevents the light support 76 from being pulled completely out of the housing 40.

The light supports 76 may be pulled their full length from the housing 40, and twisted so as to be able to emit light onto the work area adjacent the level 12, as suggested in FIG. 4, or they may merely be extended out of the housing 40, through their respective openings 88, just to their closest sight opening 24 or 26 as shown in FIG. 1.

By providing a housing which is securable to almost any size or type of spirit level with articulable light emitting means, a craftsman is able to adapt any level he has to low light conditions, which being able to conveniently light a portion of his work area as well, from the light adapter temporarily attached to his level.

I claim:

1. A spirit level light adapter kit assembly for easy attachment to a spirit level for lighting of the level and its work are, the level to which the light kit assembly will be attached having a substantially rectangular frame and a sight opening, said light adapter comprising:

a housing which is removably securable to said frame;

at least one elongated, bendably flexible, stiffly resilient tubular light support member having a distal end which supports a light emitting means reciprocally movable into and other of said housing for light the sight opening and/or work area;

a source of power for energizing said light emitting means arranged within a circuit connected to said light emitting means with a control switch to regulate said power in said circuit in said housing; and a threadable fastener securement means for removably securing said housing to the frame of a spirit level.

2. A spirit level light adapter assembly as recited in claim 1, wherein said housing has an end wall having an opening therethrough, said light support member being movable back and forth through said opening.

3. A spirit level light adapter assembly as recited in claim 2, wherein said light support member has a blocking element on its proximal end thereof, to prevent said light support from being pulled from said opening.

4. A spirit level light adapter assembly as recited in claim 3, wherein said blocking element comprises an annular ridge arranged on the edge of said distal end of said light support member.

5. A spirit level light adapter assembly as recited in claim 3, wherein said blocking element comprises a tab on said distal end of said light support member.

6. A spirit level light adapter assembly as recited in claim 5, wherein said light emitting means comprises a bulb inserted into a socket on the distal end of said light support member.

7. A spirit level light adapter assembly as recited in claim 5, wherein said housing includes an inner wall arranged so as to provide an elongated chamber for said light support member, to keep said light support member aligned in said housing.

8. A spirit level light adapter assembly as recited in claim 7, wherein said source of power comprises a battery.

9. A spirit level light adapter assembly as recited in claim 7, wherein said light support member comprises a coaxial cable having the light emitting means at its distal-most end.

10. A spirit level light adapter assembly as recited in claim 7, wherein said light support member comprises a woven metallic cable having a layer of plastic wrapped therearound.

11. A spirit level light adapter assembly as recited in claim 7, wherein said light support member comprises a bendable metal tube.

12. A spirit level light adapter assembly as recited in claim 7, wherein said light support member is extendable over said frame of said level.

13. A spirit level light adapter assembly as recited in claim 12, wherein said housing has a pair of light support members extendably arranged therein.

14. A spirit level light adapter assembly as recited in claim 13, wherein said pair of light support members are extendable through opposite ends of said housing.

15. A spirit level light adapter assembly as recited in claim 13, wherein said housing is about four inches long and about one and three quarter inches wide and about one inch high.

16. A spirit level light adapter assembly as recited in claim 13, wherein said securement means comprises a threaded fastener, interengagable with respect to the frame of a level.

17. A spirit level light adapter assembly as recited in claim 16, wherein said securement means also comprises a holding plate which receives said threaded fasteners.

18. A spirit level light adapter kit assembly easily attachable to a spirit level for lighting its sight openings and its work are, comprising:
   a housing containing an elongated stiffly bendable articulable light support having a distal end with a light thereon to be reciprocably movable into and out of said housing and extendable over a spirit level to permit a light on the distal end thereof to light the sight opening and or its work area;
   a power supply for energizing said light on the distal end of said light support; and
   attachment means for removably securing said housing to a spirit level.

* * * * *